United States Patent
Matsumoto et al.

(10) Patent No.: US 12,534,139 B2
(45) Date of Patent: Jan. 27, 2026

(54) SPAT CONTROL DEVICE

(71) Applicant: AISIN CORPORATION, Kariya (JP)

(72) Inventors: Kazuya Matsumoto, Kariya (JP); Shuhei Uchida, Kariya (JP); Ryota Tachi, Kariya (JP); Mamoru Morita, Kariya (JP)

(73) Assignee: AISIN CORPORATION, Kariya (JP)

( * ) Notice: Subject to any disclaimer, the term of this patent is extended or adjusted under 35 U.S.C. 154(b) by 378 days.

(21) Appl. No.: 18/364,213

(22) Filed: Aug. 2, 2023

(65) Prior Publication Data
US 2024/0043072 A1   Feb. 8, 2024

(30) Foreign Application Priority Data
Aug. 3, 2022  (JP) ................. 2022-123993

(51) Int. Cl.
*B62D 37/02*   (2006.01)
*B62D 35/02*   (2006.01)

(52) U.S. Cl.
CPC ............ *B62D 37/02* (2013.01); *B62D 35/02* (2013.01)

(58) Field of Classification Search
CPC ...... B62D 35/00; B62D 35/005; B62D 35/02; B62D 37/02
USPC .......................................... 296/180.2, 180.5
See application file for complete search history.

(56) References Cited

U.S. PATENT DOCUMENTS

| | | | |
|---|---|---|---|
| 10,272,957 B2 * | 4/2019 | Klop | B62D 37/02 |
| 11,560,185 B2 * | 1/2023 | Kelly | B62D 37/02 |
| 2008/0315622 A1 | 12/2008 | Oda | |
| 2019/0152543 A1 * | 5/2019 | Shiga | B62D 37/02 |

FOREIGN PATENT DOCUMENTS

| | | | | |
|---|---|---|---|---|
| DE | 102021121519 A1 * | 2/2023 | ............ | B62D 37/02 |
| FR | 3156422 A1 * | 6/2025 | ............ | B62D 37/02 |
| JP | 2009-12763 A | 1/2009 | | |
| JP | 2016-94073 A | 5/2016 | | |

* cited by examiner

*Primary Examiner* — Jason S Daniels
(74) *Attorney, Agent, or Firm* — Finnegan, Henderson, Farabow, Garrett and Dunner, LLP

(57) ABSTRACT

A spat control device controls a spat device that includes a right spat and a left spat for front wheels of a vehicle. The spat control device includes: an acquisition unit acquiring a shape of a road in front of the vehicle; and a control unit adjusting deployment amounts of the spats by controlling drive units of the spat device. When the vehicle travels on a curve, the right or left wheel that is on an inner side of a turn is set to an inner wheel and the other wheel that is on an outer side of the turn is set to an outer wheel. When the acquired road shape includes the curve, the control unit performs an adjustment process of making a deployment amount of one of the spats, corresponding to the outer wheel, larger than a deployment amount of another spat corresponding to the inner wheel.

6 Claims, 2 Drawing Sheets

SPAT CONTROL DEVICE

CROSS REFERENCE TO RELATED APPLICATIONS

This application is based on and claims priority under 35 U.S.C. § 119 to Japanese Patent Application 2022-123993, filed on Aug. 3, 2022, the entire content of which is incorporated herein by reference.

TECHNICAL FIELD

This disclosure relates to a spat control device.

BACKGROUND DISCUSSION

JP 2016-94073A (Reference 1) discloses a spat device including a spat, a drive unit that drives the spat, and a link mechanism that transmits power from the drive unit to the spat. When the vehicle travels at a high speed, the spat device improves an aerodynamic performance of the vehicle by deploying the spat in front of the wheel.

It is desired that the vehicle as described above improve not only the aerodynamic performance during the high-speed travel but also drivability.

SUMMARY

According to an aspect of this disclosure, there is provided a spat control device for controlling a spat device, the spat device including a right spat configured to operate between a position where the right spat is deployed in front of a right wheel of a vehicle and a position where the right spat is retracted from the front of the right wheel, a left spat configured to operate between a position where the left spat is deployed in front of a left wheel of the vehicle and a position where the left spat is retracted from the front of the left wheel, a right drive unit configured to drive the right spat, and a left drive unit configured to drive the left spat, and the spat control device includes: an acquisition unit configured to acquire a shape of a traveling road in front of the vehicle; and a control unit configured to adjust a deployment amount of the right spat and a deployment amount of the left spat by controlling the right drive unit and the left drive unit. When the vehicle travels on a curve, one of the right wheel and the left wheel that is on an inner side of a turn is set to an inner wheel and the other one of the right wheel and the left wheel that is on an outer side of the turn is set to an outer wheel, and when the traveling road acquired by the acquisition unit includes the curve, the control unit performs an adjustment process of making a deployment amount of a spat, corresponding to the outer wheel, of the right and left spats larger than a deployment amount of a spat corresponding to the inner wheel.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a vehicle including a spat control device (hereinafter, referred to as a "control device") will be described.

Configuration of Embodiment Disclosed Here

Figure 1:
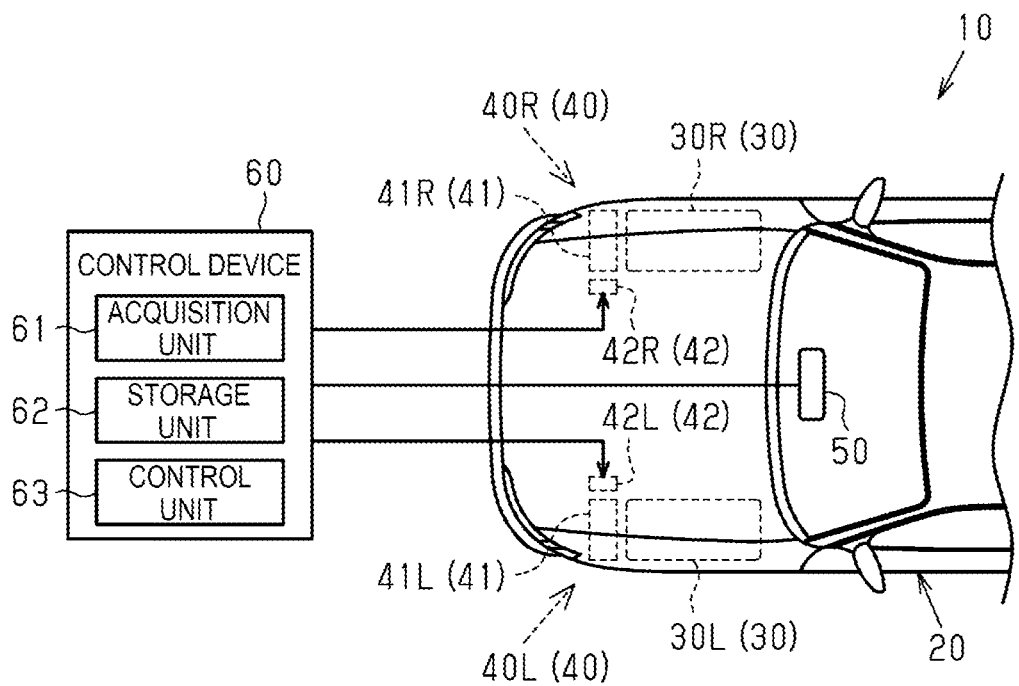
FIG. 1 is a plan view of a vehicle.

As shown in FIG. 1, a vehicle 10 includes a vehicle body 20, wheels 30, spat devices 40, a navigation device 50, and a control device 60. The wheels 30 include a right front wheel 30R as a "right wheel" and a left front wheel 30L as a "left wheel". Although not shown in FIG. 1, the wheels 30 include a right rear wheel and a left rear wheel.

<Spat Device 40>

The spat device 40 includes a right spat device 40R corresponding to the right front wheel 30R and a left spat device 40L corresponding to the left front wheel 30L. The right spat device 40R includes a right spat 41R and a right drive unit 42R. Similarly, the left spat device 40L includes a left spat 41L and a left drive unit 42L. In the following description, both the right spat 41R and the left spat 41L are referred to as a "spat 41", and both the right drive unit 42R and the left drive unit 42L are referred to as a "drive unit 42".

Figure 2:
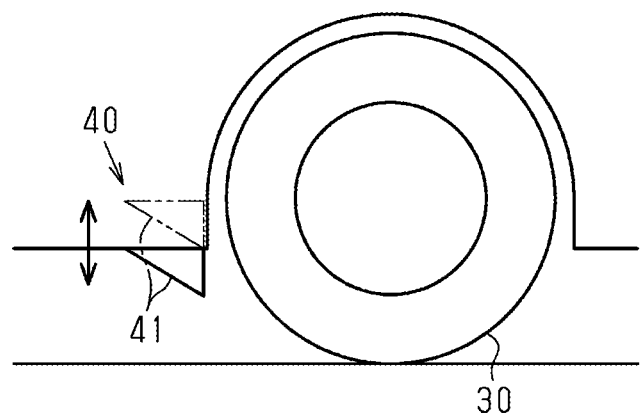
FIG. 2 is a side view of the vehicle.

The spat 41 is for rectifying airflow around the front wheel when the vehicle 10 travels at a high speed. The spat 41 is preferably formed of a lightweight and highly rigid resin material or the like. The drive unit 42 drives the spat 41. At this time, the spat 41 operates between a deployed position where the spat 41 is deployed in a region in front of the corresponding wheel 30 and a retracted position where the spat 41 is retracted from the region in front of the corresponding wheel 30. In FIG. 2, the deployed position of the spat 41 is indicated by a solid line, and a storage position of the spat 41 is indicated by a two-dot chain line. As indicated by solid arrows in FIG. 2, the drive unit 42 adjusts a deployment amount of the spat 41 based on a control signal transmitted from the control device 60.

Here, the deployment amount of the spat 41 is an amount indicating an opening degree of the spat 41. When the spat 41 is positioned at the deployed position, the deployment amount of the spat 41 is the maximum "100%". On the other hand, when the spat 41 is positioned at the storage position, the deployment amount of the spat 41 is the minimum "0%". In the embodiment disclosed here, the deployment amount of the spat 41 can be appropriately changed between "0%" and "100%". An adjustment width of the deployment amount of the spat 41 may be "5%" or "10%". As the deployment amount of the spat 41 increases, an effect of rectifying the airflow around the front wheel is improved.

The drive unit 42 includes, for example, an electric motor and a transmission mechanism that transmits power of the electric motor to the spat 41. The transmission mechanism may be a link mechanism or may include a plurality of gears.

<Navigation Device 50>

The navigation device 50 holds a vehicle body speed which is a traveling speed of the vehicle 10, information on a traveling road on which the vehicle 10 travels, and information on a current position of the vehicle 10. The information on the traveling road on which the vehicle 10 travels includes a radius of the road, a gradient of the road, and the like. The navigation device 50 transmits such information to the control device 60.

<Control Device 60>

The control device 60 includes, for example, a processing circuit including a computer and a memory. The control device 60 controls the spat device 40 in accordance with a program stored in the memory. As shown in FIG. 1, the control device 60 includes an acquisition unit 61, a storage unit 62, and a control unit 63 as functional units.

The acquisition unit 61 acquires various types of information transmitted from the navigation device 50. For example, the acquisition unit 61 acquires the vehicle body speed which is the traveling speed of the vehicle 10, or acquires a shape of a traveling road in front of the vehicle 10. In another embodiment, the acquisition unit 61 may acquire the shape of the traveling road in front of the vehicle 10 based on a detection result of a surroundings monitoring device such as a camera.

The storage unit 62 stores an operation mode selected by a user. In the embodiment disclosed here, the operation mode includes a first operation mode and a second operation mode in which vehicle behaviors are different for steering. The first operation mode is an operation mode having a stronger oversteer tendency during a turn than the second operation mode. The operation mode is selected by, for example, operating a switch provided on a steering wheel, an instrument panel, or the like.

The control unit 63 individually adjusts the positions of the right spat 41R and the left spat 41L by individually controlling the right drive unit 42R and the left drive unit 42L based on the various types of information acquired by the acquisition unit 61. Hereinafter, it will be described in detail.

The control unit 63 deploys and stores the right spat 41R and the left spat 41L in accordance with the vehicle body speed. Specifically, when the vehicle body speed is equal to or higher than a predetermined determination speed, the control unit 63 disposes the right spat 41R and the left spat 41L at the deployed positions. On the other hand, when the vehicle body speed is lower than the determination speed, the control unit 63 disposes the right spat 41R and the left spat 41L at the storage positions. The determination speed is a speed for determining whether the traveling speed of the vehicle 10 is a speed at which the rectifying effect of the spat 41 is exhibited. The determination speed for determining the deployment of the spat 41 and the determination speed for determining the storage of the spat 41 may be different.

Further, when the vehicle body speed is equal to or higher than the determination speed, the control unit 63 determines whether a curve is present on the traveling road in front of the vehicle 10 based on the information acquired by the acquisition unit 61. Whether the traveling road in front of the vehicle 10 includes a curve may be determined based on whether the radius of the traveling road in front of the vehicle 10 is less than a predetermined determination value.

When the traveling road in front of the vehicle 10 includes a curve, the control unit 63 performs an adjustment process of providing a difference between the deployment amounts of the right spat 41R and the left spat 41L in accordance with a turning direction of the vehicle 10 when traveling on the curve. Here, when the vehicle 10 travels on a curve, the wheel 30 on an inner side of a turn is set to an inner wheel, and the wheel 30 on an outer side of the turn is set to an outer wheel. When the traveling road in front of the vehicle 10 includes a curve, in the adjustment process, the control unit 63 makes the deployment amount of the spat 41 corresponding to the outer wheel larger than the deployment amount of the spat 41 corresponding to the inner wheel.

When the traveling road in front of the vehicle 10 is a right curve, the deployment amount of the left spat 41L is larger than the deployment amount of the right spat 41R by performing the adjustment process. For example, the deployment amount of the left spat 41L is "80%", and the deployment amount of the right spat 41R is "20%".

In this manner, the control unit 63 increases a yawing moment generated in the turning direction of the vehicle 10 by providing the difference between the deployment amounts of the left and right spats 41. As a result, a steering force of the steering wheel is reduced in that the vehicle 10 easily performs a turn along the curve. The control unit 63 preferably completes the adjustment process when the vehicle 10 is at a position before reaching the curve.

In the vehicle 10 according to the embodiment disclosed here, the user can select the operation mode. When the first operation mode is selected, the control unit 63 increases the difference between the deployment amount of the spat 41 corresponding to the outer wheel and the deployment amount of the spat 41 corresponding to the inner wheel, as compared with when the second operation mode is selected. At this time, the control unit 63 may increase only the deployment amount of the spat 41 corresponding to the outer wheel, or may decrease only the deployment amount of the spat 41 corresponding to the inner wheel. In addition, the control unit 63 may increase the deployment amount of the spat 41 corresponding to the outer wheel while decreasing the deployment amount of the spat 41 corresponding to the inner wheel. Thus, when the first operation mode is selected, a yawing moment generated in the turning direction of the vehicle 10 is larger as compared with when the second operation mode is selected.

When the radius of the curve is small, a driver needs to increase the steering force of the steering wheel as compared with when the radius of the curve is large. When the radius of the curve is small, the control unit 63 increases the difference between the deployment amount of the spat 41 corresponding to the outer wheel and the deployment amount of the spat 41 corresponding to the inner wheel as compared with when the radius of the curve is large. At this time, the control unit 63 may increase only the deployment amount of the spat 41 corresponding to the outer wheel in accordance with the radius of the curve, or may decrease only the deployment amount of the spat 41 corresponding to the inner wheel in accordance with the radius of the curve. In addition, the control unit 63 may increase the deployment amount of the spat 41 corresponding to the outer wheel in accordance with the radius of the curve while decreasing the deployment amount of the spat 41 corresponding to the inner wheel in accordance with the radius of the curve. Thus, when the radius of the curve is small, the yawing moment generated in the turning direction of the vehicle 10 is larger as compared with when the radius of the curve is large.

<Process of Control Device 60>

A flow of a process performed by the control device 60 will be described with reference to a flowchart shown in FIG. 3. This process is performed when the vehicle body speed is equal to or higher than the determination speed.

Figure 3:
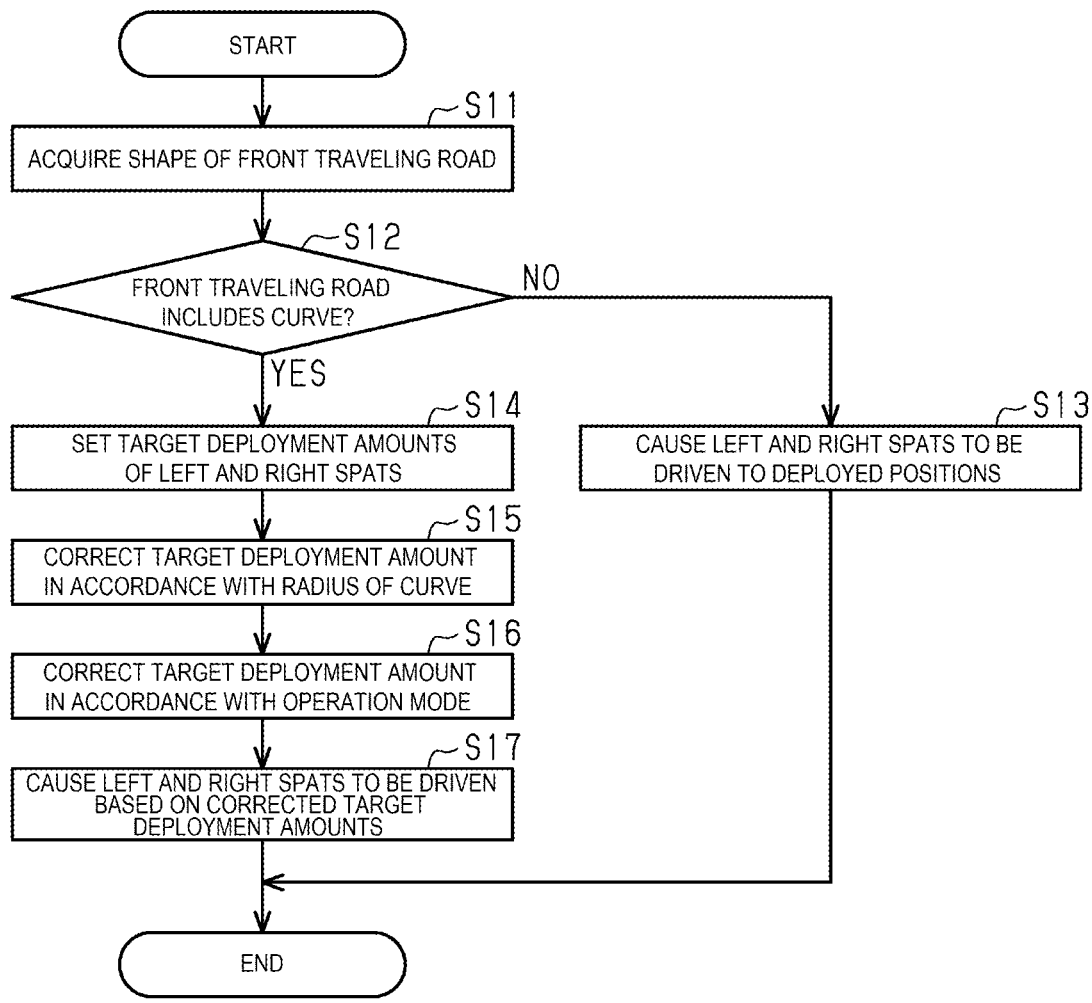
FIG. 3 is a flowchart showing a flow of a process performed by a control device.

As shown in FIG. 3, the control device 60 acquires the shape of the traveling road in front of the vehicle 10 (S11). Subsequently, the control device 60 determines whether the traveling road in front of the vehicle 10 includes a curve (S12). When the traveling road in front of the vehicle 10 does not include a curve (S12: NO), the control device 60 causes the left and right spats 41 to be driven to the deployed positions (S13). Thereafter, the control device 60 ends the present process. When the traveling road in front of the vehicle 10 does not include a curve and the left and right spats 41 are already disposed at the deployed positions, the control device 60 ends the present process without causing the left and right spats 41 to be driven.

In step S12, when the traveling road in front of the vehicle 10 includes a curve (S12: YES), the control device 60 sets target deployment amounts of the left and right spats 41 (S14). Here, the deployment amount of the spat 41 corresponding to the outer wheel is set to be larger than the deployment amount of the spat 41 corresponding to the inner wheel. Subsequently, the control device 60 corrects the target deployment amount in accordance with the radius of the curve in front of the vehicle 10 and the operation mode selected by the user (S15, S16). Thereafter, the control device 60 causes the left and right spats 41 to be driven based on the corrected target deployment amounts of the left and right spats 41 (S17). In this manner, a difference occurs between the deployment amounts of the left and right spats 41. Thereafter, the control device 60 ends the present process.

Although not shown in FIG. 3, when the vehicle body speed is lower than the determination speed, the spats 41 are driven to the storage positions. Further, in FIG. 3, the adjustment process corresponds to the processing of steps S14 to S17.

Function of Embodiment Disclosed Here

A deployed state of the spat 41 in the traveling vehicle 10 will be described with reference to FIG. 4.

Figure 4:
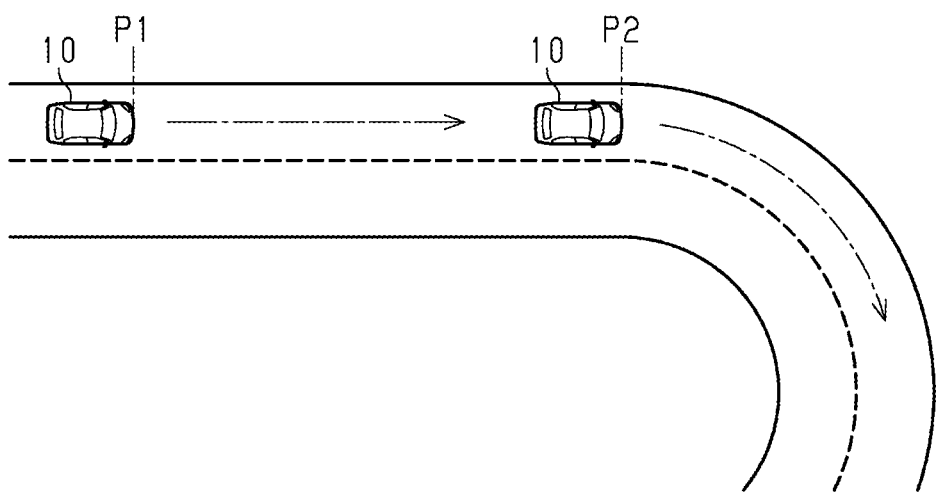
FIG. 4 is a schematic diagram showing the vehicle traveling on a traveling road.

As shown in FIG. 4, when the vehicle 10 reaches a position P1 before reaching a right curve, the adjustment process is performed. In the adjustment process, the target deployment amount of the left spat 41L serving as the spat 41 corresponding to the outer wheel is set to be larger than the target deployment amount of the right spat 41R serving as the spat 41 corresponding to the inner wheel. Subsequently, the target deployment amounts of the left and right spats 41 are corrected in accordance with the selected operation mode and the radius of the curve. As a result, as an example, the target deployment amount of the right spat 41R is set to "0%", and the target deployment amount of the left spat 41L is set to "100%". In this case, the right spat 41R is disposed at the storage position, and the left spat 41L is disposed at the deployed position. The position adjustment of the left and right spats 41 is completed when the vehicle 10 reaches a position P2 before reaching the curve. Therefore, when the vehicle 10 travels on a curve, the yawing moment generated in the turning direction of the vehicle 10 increases. Therefore, the vehicle 10 can travel along the curve even when the user does not increase the steering force of the steering wheel.

Effects of Embodiment Disclosed Here (1) When the traveling road in front of the vehicle 10 includes a curve, the control device 60 performs the adjustment process. Therefore, when the vehicle 10 travels on the curve, the yawing moment generated in the turning direction of the vehicle 10 increases as compared with when the adjustment process is not performed. Therefore, the steering force required to cause the vehicle 10 to travel along the curve is reduced. Accordingly, the control device 60 can improve drivability.

(2) The control device 60 can increase or decrease the oversteer tendency when the vehicle travels on a curve in accordance with the operation mode selected by the user. Therefore, the control device 60 can bring a vehicle behavior when the vehicle travels on the curve close to a vehicle behavior desired by the user.

(3) The control device 60 can increase the oversteer tendency as the radius of the curve is smaller. Therefore, the control device 60 can reduce the steering force even when the radius of the curve is small.

(4) The deployment amount of the spat 41 is adjusted based on the power transmitted from the drive unit 42. Therefore, after the vehicle 10 enters a curve, for example, when the spat 41 starts to be driven after a steering amount becomes equal to or greater than a predetermined determination value, the vehicle 10 may enter the curve or pass through the curve when the adjustment of the position of the spat 41 is completed. In this regard, the spat device 40 completes the adjustment of the deployment amounts of the left and right spats 41 before the vehicle 10 enters the curve. Therefore, the control device 60 can reduce the steering force from the beginning of traveling on the curve. That is, the control device 60 can prevent the occurrence of the above situation.

<Modification>

The embodiment disclosed here can be modified as follows. The embodiment disclosed here and the following modifications can be implemented in combination with each other as long as the embodiment disclosed here and the modifications do not have technical contradiction.

The vehicle 10 may include a spat device corresponding to the right rear wheel and a spat device corresponding to the left rear wheel. In this case, in the adjustment process, the control device 60 may drive the spat device corresponding to the right rear wheel and the spat device corresponding to the left rear wheel in addition to the right spat device 40R corresponding to the right front wheel 30R and the left spat device 40L corresponding to the left front wheel 30L.

When the determination speed is a first determination speed and the vehicle 10 does not travel on a curve, the control device 60 may determine whether to deploy the left and right spats 41 based on whether the vehicle body speed is equal to or higher than the first determination speed. Further, the control device 60 may determine whether to perform the adjustment process based on whether the vehicle body speed is equal to or higher than a second determination speed lower than the first determination speed. That is, even when the vehicle body speed is lower than the first determination speed, the control device 60 may perform the adjustment process as long as the vehicle body speed is equal to or higher than the second determination speed.

When the vehicle 10 travels on a curve, if the radius of the curve on which the vehicle 10 travels changes, the control device 60 may change the deployment amounts of the left and right spats 41.

The control device 60 may correct the deployment amounts of the left and right spats 41 in accordance with the vehicle body speed.

A timing at which the control device 60 completes the adjustment process may be a timing after the vehicle 10 enters the curve. However, the timing at which the control device 60 completes the adjustment process is preferably a timing immediately after the vehicle 10 enters the curve.

The spat device 40 may not provide the difference between the deployment amounts of the left and right spats 41 in accordance with the radius of the curve and the selected operation mode. That is, steps S16 and S17 may be omitted in the flowchart shown in FIG. 3.

The control device 60 is not limited to the processing circuit that includes a CPU and a ROM and executes software processing. For example, the control device 60 may include a dedicated hardware circuit that executes at least a part of the various processes executed in the above embodiments. Examples of the dedicated hardware circuit include an ASIC. The ASIC is an abbreviation of "Application Specific Integrated Circuit". That is, the control device 60 may have any one of the following configurations (a) to (c).
- (a) A processing circuit includes a processing device that executes all of the above processes according to a program, and a program storage device, such as a ROM, that stores the program.
- (b) A processing circuit includes a processing device that execute a part of the above processes according to a program and a program storage device, and a dedicated hardware circuit that executes the remaining processes.
- (c) A processing circuit includes a dedicated hardware circuit that executes all the processes described above.

Here, there may be a plurality of software execution devices including a processing device and a program storage device, and a plurality of dedicated hardware circuits.

(Aspect 1) In order to solve the above problems, there is provided a spat control device for controlling a spat device, the spat device including a right spat configured to operate between a position where the right spat is deployed in front of a right wheel of a vehicle and a position where the right spat is retracted from the front of the right wheel, a left spat configured to operate between a position where the left spat is deployed in front of a left wheel of the vehicle and a position where the left spat is retracted from the front of the left wheel, a right drive unit configured to drive the right spat, and a left drive unit configured to drive the left spat, and the spat control device includes: an acquisition unit configured to acquire a shape of a traveling road in front of the vehicle; and a control unit configured to adjust a deployment amount of the right spat and a deployment amount of the left spat by controlling the right drive unit and the left drive unit. When the vehicle travels on a curve, one of the right wheel and the left wheel that is on an inner side of a turn is set to an inner wheel and the other one of the right wheel and the left wheel that is on an outer side of the turn is set to an outer wheel, and when the traveling road acquired by the acquisition unit includes the curve, the control unit performs an adjustment process of making a deployment amount of a spat, corresponding to the outer wheel, of the right and left spats larger than a deployment amount of a spat corresponding to the inner wheel.

When the traveling road in front of the vehicle includes a curve, the spat control device performs the adjustment process to make the deployment amount of the spat corresponding to the outer wheel larger than the deployment amount of the spat corresponding to the inner wheel. Therefore, when the vehicle travels on a curve, a yawing moment generated in the turning direction of the vehicle increases as compared with when the adjustment process is not performed. Therefore, the steering force required to cause the vehicle to travel along the curve is reduced. Accordingly, the spat control device can improve drivability.

(Aspect 2) It is preferable that the spat control device according to Aspect 1 further includes a storage unit configured to store an operation mode selected by a user from a plurality of operation modes having different vehicle behaviors for steering, and the control unit, in the adjustment process, adjusts the deployment amount of the spat corresponding to the outer wheel and the deployment amount of the spat corresponding to the inner wheel in accordance with the operation mode stored in the storage unit.

The spat control device can increase or decrease the oversteer tendency when the vehicle travels on a curve in accordance with the operation mode selected by the user. Therefore, the spat control device can bring a vehicle behavior when the vehicle travels on the curve close to a vehicle behavior desired by the user.

(Aspect 3) In the spat control device according to Aspect 1, it is preferable that in the adjustment process, when a radius of the curve is small, the control unit increases a difference between the deployment amount of the spat corresponding to the outer wheel and the deployment amount of the spat corresponding to the inner wheel as compared with when the radius of the curve is large.

The spat control device can increase the oversteer tendency as the radius of the curve is smaller. Therefore, the spat control device can reduce the steering force even when the radius of the curve is small.

(Aspect 4) In the spat control device according to any one of Aspects 1 to 3, it is preferable that the control unit completes the adjustment process before reaching the curve.

The spat control device can complete the adjustment of the deployment amounts of the left and right spats before the vehicle enters the curve. Therefore, the spat control device can reduce the steering force from the beginning of traveling on the curve.

The spat control device can improve drivability.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A spat control device for controlling a spat device, the spat device including a right spat configured to operate between a position where the right spat is deployed in front of a right wheel of a vehicle and a position where the right spat is retracted from the front of the right wheel, a left spat configured to operate between a position where the left spat is deployed in front of a left wheel of the vehicle and a position where the left spat is retracted from the front of the left wheel, a right drive unit configured to drive the right spat, and a left drive unit configured to drive the left spat, the spat control device comprising:
   an acquisition unit configured to acquire a shape of a traveling road in front of the vehicle; and
   a control unit configured to adjust a deployment amount of the right spat and a deployment amount of the left spat by controlling the right drive unit and the left drive unit, wherein
   when the vehicle travels on a curve, one of the right wheel and the left wheel that is on an inner side of a turn is set to an inner wheel and the other one of the right wheel and the left wheel that is on an outer side of the turn is set to an outer wheel, and
   when the traveling road acquired by the acquisition unit includes the curve, the control unit performs an adjustment process of making a deployment amount of a spat, corresponding to the outer wheel, of the right and left spats larger than a deployment amount of a spat corresponding to the inner wheel.

2. The spat control device according to claim 1, further comprising:
a storage unit configured to store an operation mode selected by a user from a plurality of operation modes having different vehicle behaviors for steering, wherein
in the adjustment process, the control unit adjusts the deployment amount of the spat corresponding to the outer wheel and the deployment amount of the spat corresponding to the inner wheel in accordance with the operation mode stored in the storage unit.

3. The spat control device according to claim 1, wherein in the adjustment process, when a radius of the curve is small, the control unit increases a difference between the deployment amount of the spat corresponding to the outer wheel and the deployment amount of the spat corresponding to the inner wheel as compared with when the radius of the curve is large.

4. The spat control device according to claim 1, wherein the control unit completes the adjustment process before reaching the curve.

5. The spat control device according to claim 2, wherein the control unit completes the adjustment process before reaching the curve.

6. The spat control device according to claim 3, wherein the control unit completes the adjustment process before reaching the curve.

* * * * *